(12) United States Patent
Iyama (10) Patent No.: US 7,872,811 B2
(45) Date of Patent: Jan. 18, 2011

(54) IMAGING OPTICAL SYSTEM, AND IMAGING APPARATUS INCORPORATING THE SAME

(75) Inventor: Noriyuki Iyama, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 12/587,951

(22) Filed: Oct. 14, 2009

(65) Prior Publication Data
US 2010/0103534 A1 Apr. 29, 2010

(30) Foreign Application Priority Data
Oct. 29, 2008 (JP) .............................. 2008-277714

(51) Int. Cl.
*G02B 3/02* (2006.01)
*G02B 13/18* (2006.01)
*G02B 9/34* (2006.01)

(52) U.S. Cl. ........................ 359/717; 359/740; 359/781; 359/793

(58) Field of Classification Search ................. 359/717, 359/740, 781, 793
See application file for complete search history.

(56) References Cited

U.S. PATENT DOCUMENTS

| 7,405,890 | B2 * | 7/2008 | Nakamura | ................. | 359/781 |
| 7,518,809 | B2 * | 4/2009 | Yamakawa et al. | .......... | 359/781 |
| 7,697,221 | B2 * | 4/2010 | Mori | ......................... | 359/781 |
| 2008/0316618 | A1 * | 12/2008 | Yamakawa et al. | .......... | 359/781 |

FOREIGN PATENT DOCUMENTS

| JP | 2002-244031 | 8/2002 |
| JP | 2005-227426 | 8/2005 |
| JP | 2006-259704 | 9/2006 |
| JP | 2007-101920 | 4/2007 |

* cited by examiner

*Primary Examiner*—Evelyn A. Lester
(74) *Attorney, Agent, or Firm*—Kenyon & Kenyon LLP (57) ABSTRACT

An imaging optical system consists of, in order from its object side, a front lens group of negative refracting power, and a rear lens group of positive refracting power. A lens component is defined by a lens body having only two surfaces: an object side surface and an image side surface in contact with air on an optical axis. The front lens group comprises, in order from its object side, a first lens component concave on its image side and having negative refracting power, and a second lens component concave on its image side and having negative refracting power. The rear lens group comprises, in order from its object side, a third lens component convex on its object side and having positive refracting power, and a fourth lens component having positive refracting power. The sum of the total number of lens components in the front lens group and the total number of lens components in the rear lens group is 4. The third component comprises a plastic positive lens that includes an aspheric surface and satisfies the following conditions (1-1) and (1-2):

$$19 < v3 < 29 \quad (1\text{-}1)$$

$$1.59 < n3 < 1.80 \quad (1\text{-}2)$$

where v3 is the Abbe constant of the plastic positive lens in the third lens component, and n3 is the d-line refractive index of the plastic positive lens in the third lens component.

17 Claims, 9 Drawing Sheets

Example 1

FIG.1

Example 1

FIG.2

Example 2

FIG.3

Example 3

FIG.4
Example 1

FIG.5
Example 2

FIG.6
Example 3

IMAGING OPTICAL SYSTEM, AND IMAGING APPARATUS INCORPORATING THE SAME

This application claims benefits of Japanese Application No. 2008-277714 filed in Japan on Oct. 29, 2008, the contents of which are incorporated by this reference.

BACKGROUND OF THE INVENTION

The present invention relates generally to an imaging optical system lending itself to imaging apparatus using imaging devices such as CCDs or CMOSs, and more particularly to an imaging apparatus equipped with such an imaging optical system.

Surveillance cameras, cameras mounted on interphones, and on-board cameras are now gaining popularity. For instance, the on-boards cameras are being used as visual identification cameras plus higher sensor cameras used for detecting white lines, and keeping watch over swerving from lanes, obstacles, and drivers.

Optical systems used with these cameras require a fisheye optical system having a half angle of view of, e.g., about 80° or greater for the purpose of making the visible angle of view wide thereby eliminating or reducing blind spots. There is also mounting demand for an imaging optical system that is not only compact but also works for cost reductions. Such imaging optical systems having a half angle of view of the order of 80° are known from Patent Publications 1, 2, 3 and 4.

Patent Publication 1: JP(A) 2002-244031
Patent Publication 2: JP(A) 2005-227426
Patent Publication 3: JP(A) 2006-259704
Patent Publication 4: JP(A) 2007-101920

However, the imaging optical system set forth in Patent Publication 1 has a long whole length relative to its focal length, and so goes against the reductions of general size, and especially diametrical size. Patent Publication 2 shows imaging optical systems, most of which comprise five singles lens and are hard to decrease in size. Patent Publication 2 also discloses an imaging optical system comprising four single lenses; however, it has a long whole length relative to its focal length, and so goes against the reductions of general size, and especially diametrical size. For the imaging optical system set forth in Patent Publication 3, lenses having large aspheric biases are used for correction of aberrations, and so fabrication costs are on the increase. The imaging optical system disclosed in Patent Publication 4 is susceptible of cost rises because of using two or more glass lenses.

Having been made with such problems in mind, the present invention has for its one object to provide an imaging optical system that works more in favor of size reductions and cost reductions while making sure a wide angle of view and optical performance. Another object of the invention is to provide an imaging apparatus incorporating such an imaging optical system.

SUMMARY OF THE INVENTION

According to the invention, the above object is accomplishable by the provision of an imaging optical system consisting of, in order from its object side, a front lens group of negative refracting power and a rear lens group of positive refracting power, characterized in that when a lens component is defined by a lens body having only two surfaces: an object side surface and an image side surface in contact with air on an optical axis, said front lens group comprises, in order from its object side, a first lens component concave on its image side and having negative refracting power and a second lens component concave on its image side and having negative refracting power, said rear lens group comprises, in order from its object side, a third lens component convex on its object side and having positive refracting power and a fourth lens component having positive refracting power, an aperture stop is located between said third lens component and said fourth lens component, the sum of the total number of lens components in said front lens group and the total number of lens components in said rear lens group is 4, and said third component comprises a plastic positive lens that includes an aspheric surface and satisfies the following conditions (1-1) and (1-2):

$$19 < \nu_3 < 29 \quad (1\text{-}1)$$

$$1.59 < n_3 < 1.80 \quad (1\text{-}2)$$

where $\nu_3$ is the Abbe constant of said plastic positive lens in said third lens component, and $n_3$ is the d-line refractive index of said plastic positive lens in said third lens component.

In general, an imaging optical system having a wide angle of view relies upon a retrofocus type optical system that comprises, in order from its object side, a front lens group of negative refracting power and a rear lens group of positive refracting power.

To obtain a wide angle of view with such an optical system, the focal length of the whole optical system must be shortened. To this end, the negative refracting power of the front lens group having negative refracting power must be increased to bring the principal point position of the whole optical system near to an image plane side. And aberrations occurring from such arrangement must be corrected by properly configuring the rear lens group of positive refracting power; however, as the positive refracting power increases, it renders spherical aberrations likely to grow large.

The imaging optical system must be made compact when the associated camera is mounted on interphones or motor cars. To this end, both the front and the rear lens group must have large absolute values of refracting power.

Therefore, the imaging optical system of the invention is constructed of, in order from its object side, a front lens group of negative refracting power and a rear lens group of positive refracting power. The front lens group is made up of, in order from its object side, two lens components: a first lens component that is concave on its image side and has negative refracting power and a second lens component that is concave on its image side and has negative refracting power, and the rear lens group is built up of, in order from its object side, two lens components: a third lens component that is convex on its object side and has positive refracting power and a fourth lens component that has positive refracting power, with an aperture stop located between the third and the fourth lens component.

This arrangement ensures that an axial bundle that transmits through the front lens group of negative refracting power and diverges out is condensed onto the rear lens group of positive refracting power. The refracting power of each lens group is shared by two lens components, working for reductions of aberrations and making sure the angle of view, although the lens group is composed of fewer lenses. The stronger the degree of the convergence of the axial bundle by the lens group of positive refracting power, the more it works in favor of wider angles of view and size reductions.

An ordinary retrofocus type imaging optical system is likely to produce chromatic aberration of magnification. Especially with an imaging optical system having a wider angle of view, large chromatic aberration of magnification is likely to occur at the first and the second lens component where the position of incidence of off-axis light rays is far away from an optical axis.

To correct the chromatic aberration of magnification occurring at two such lens components, it is preferable to reduce as much as possible the Abbe constant of the positive lens in the third lens component, thereby canceling out the chromatic aberration of magnification produced at the first and the second lens component.

Condition (1-1) defines the preferable Abbe constant of the positive lens in the third lens component. Avoiding being in excess of the upper limit of condition (1-1) works in favor of making sure the function of canceling out the chromatic aberration of magnification occurring at the first and the second lens component. As the lower limit of condition (1-1) is not reached, any preferable plastic material is not available for aspheric lens material: only glass or other materials less likely to be processed into aspheric shape are available.

With the arrangement having a wider angle of view, the positive refracting power of the positive lens in the third lens component is likely to grow large. On the other hand, the use of glass lenses goes against cost reductions. In the invention, therefore, this positive lens is configured as a plastic aspheric lens that favors correction of spherical aberrations, and reliance is on the material that is easily processed into an aspheric shape.

Condition (1-2) defines the preferable refractive index of the positive lens in the third lens component for the purpose of making sure optical performance. Avoiding being short of the lower limit of condition (1-2) makes sure that refractive index so that the third lens component can have sufficient positive refracting power and the amount of an aspheric bias can easily be minimized, working for correction of spherical aberrations, size reductions, and making sure brightness. As the upper limit of condition (1-2) is exceeded, any preferable plastic material is not available for aspheric lens material: only glass or other materials less likely to be processed into aspheric shape are available.

Thus, the invention provides an imaging optical system that works more in favor of making sure a wider angle of view and optical performance, size reductions, and cost reductions.

More preferably in the invention as described above, one or two or more of the following requirements should be satisfied.

It is preferable that the first lens component is a single lens.

It is preferable that the second lens component is a single lens.

It is preferable that the third lens component is a single lens.

It is preferable that the fourth lens component is a single lens.

This works more in favor of the slimming down of each lens component, and cost reductions.

More preferably for size reductions and cost reductions, the first, the second, the third and the fourth lens components should be all single lenses.

It is preferable that the lens located in the first lens component and nearest to the object side is a glass lens, and that the second, the third, and the fourth lens component comprises a plastic lens.

The glass lens located in the first lens component and nearest to the object side is less vulnerable to flaws irrespective of whether or not a transparent member for protecting the imaging optical system is located more on the object side than the first lens component. And if an aspheric surface is located in the second, the third, and the fourth lens component and that aspheric surface is formed by the lens surface of a plastic lens, it then works more for improvements in optical performance while processing costs are slashed.

For the front lens group it is preferable to satisfy the following condition (2):

$$0.45 < fa/|f12| < 0.65 \tag{2}$$

where
f12 is the focal length of the front lens group, and
fa is the focal length of the whole imaging optical system.

For the purpose of preventing more the occurrence of chromatic aberration of magnification at the first, and the second lens component, it is effective to make small the effective diameter of the first, and the second lens component. It is thus preferable that for the purpose of properly determining the position of an entrance pupil and making small the effective diameter of the first, and the second lens component, the combined system of the first and second lens components has negative refracting power capable of satisfying condition (2).

Avoiding being short of the lower limit of condition (2) makes sure the front lens group has negative refracting power, working for size reductions of the imaging optical system. Avoiding being in excess of the upper limit of condition (2) keeps the negative refracting power of the front lens group on a proper level, working for reductions of chromatic aberration of magnification.

For the second lens component it is preferable to satisfy the following condition (3):

$$0.2 < fa/|f2| < 0.45 \tag{3}$$

where
f2 is the focal length of the second lens component, and
fa is the focal length of the whole imaging optical system.

The second lens component is smaller than the first lens component in terms of the effective diameter; even when the negative refracting power of the second lens component is increased, chromatic aberration of magnification occurring there is not as large as that at the first lens component. For the purpose of allowing the front lens group to have sufficient negative refracting power and reducing the size of the imaging optical system, therefore, it is preferable for the second lens component to have negative refracting power in such a way as to satisfy condition (3).

Avoiding being short of the lower limit of condition (3) can make sure the second lens component has sufficient negative refracting power, working in favor of size reductions. Avoiding being in excess of the upper limit of condition (3) keeps the negative refracting power of the second lens component on a proper level, so that the occurrence of chromatic aberration of magnification at the second lens component per se can easily be prevented.

For the third lens component it is preferable to satisfy the following condition (4):

$$0.2 < fa/f3 < 0.33 \tag{4}$$

where
f3 is the focal length of the third lens component, and
fa is the focal length of the whole imaging optical system.

For the purpose of correcting chromatic aberration of magnification occurring at the first, and the second lens component, it is for the third lens component to have positive refracting power in such a way as to satisfy condition (4).

Avoiding being short of the lower limit of condition (4) makes sure the third lens component has positive refracting power, working more in favor correction of chromatic aberrations occurring at the front lens group. Avoiding being in excess of the upper limit of condition (4) prevents the refracting power of the third lens component from growing excessive, working more in favor of prevention of overcorrection of chromatic aberration of magnification, and reducing spherical aberrations.

For the second, and the third lens component it is preferable to satisfy the following conditions (5) and (6):

$$1.2 < R4/fa < 4 \quad (5)$$

$$2.0 < R5/fa < 5.0 \quad (6)$$

where

R4 is the paraxial radius of curvature of the image side surface of the second lens component, R5 is the paraxial radius of curvature of the object side surface of the third lens component, and fa is the focal length of the whole imaging optical system.

Condition (5) defines the preferable paraxial radius of curvature of the image side surface of the second lens group with respect to the focal length of the whole imaging optical system.

Avoiding being short of the lower limit of condition (5) makes it easy to reduce the negative refracting power of the second lens component, working more in favor of reducing chromatic aberration of magnification. Avoiding being in excess of the upper limit of condition (5) makes it easy for the second lens component to have negative refracting power, working for size reductions of the imaging optical system.

Condition (6) defines the preferable paraxial radius of curvature of the object side surface of the third lens component with respect to the focal length of the whole imaging optical system.

Avoiding being short of the lower limit of condition (6) makes it easy to keep the positive refracting power of the third lens component on a proper level, making it easy to prevent overcorrection of chromatic aberration of magnification, and reduce spherical aberrations. Avoiding being in excess of the upper limit of condition (6) makes sure the third lens component has positive refracting power, working for correction of chromatic aberration of magnification produced at the first, and the second lens component.

For the first lens component it is preferable to satisfy the following condition (7):

$$0.6 < (R1+R2)/(R1-R2) < 2.5 \quad (7)$$

where

R1 is the paraxial radius of curvature of the object side surface of the first lens component, and R2 is the paraxial radius of curvature of the image side surface of the first lens component.

Avoiding being short of the lower limit of condition (7) prevents the object side surface of the first lens component from turning to a concave surface having a small paraxial radius of curvature, working for reductions of coma. Avoiding being in excess of the upper limit of condition (7) prevents the vertex of the object side surface of the first lens component from jutting out toward the object side, working for the slimming down of the imaging optical system.

For the second lens component it is preferable to be in such a shape as to satisfy the following condition (8):

$$0.6 < (R3+R4)/(R3-R4) < 1.3 \quad (8)$$

where

R3 is the paraxial radius of curvature of the object side surface of the second lens component, and R4 is the paraxial radius of curvature of the image side surface of the second lens component.

Avoiding being short of the lower limit of condition (8) facilitates preventing coma from occurring at the object side surface of the second lens component. Avoiding being in excess of the upper limit of condition (8) makes it easy for the second lens component to have negative refracting power, working for size reductions. It also facilitates reducing the negative refracting power of the first lens component, leading to reductions of chromatic aberration of magnification.

For the third lens component it is preferable to have a double-convex shape that satisfies the following condition (9):

$$-0.6 < (R5+R6)/(R5-R6) < 0.1 \quad (9)$$

where

R5 is the paraxial radius of curvature of the object side surface of the third lens component, and R6 is the paraxial radius of curvature of the image side surface of the third lens component.

Avoiding being short of the lower limit of condition (9) makes sure the image side surface of the third lens component has positive refracting power, working for making sure the third lens component has refracting power, and reducing spherical aberrations, and avoiding being in excess of the upper limit of condition (9) makes sure the object side surface of the third lens component has positive refracting power, working for correction of off-axis aberrations produced at the front lens group.

For the fourth lens component it is preferable to being in such a shape as to satisfy the following condition (10):

$$0.5 < (R8+R9)/(R8-R9) < 1.2 \quad (10)$$

where

R8 is the paraxial radius of curvature of the object side surface of the fourth lens component, and R9 is the paraxial radius of curvature of the image side surface of the fourth lens component.

Avoiding being short of the lower limit of condition (10) prevents the object side surface of the fourth lens component from turning to a convex surface having a small radius of curvature, facilitating prevention of the occurrence of off-axis aberrations. Alternatively, it makes sure the image side surface of the fourth lens component has positive refracting power, thereby spacing the exit pupil far away from the image plane. Avoiding being in excess of the upper limit of condition (10) prevents the radius of curvature of the image side convex surface from getting too small, facilitating prevention of the occurrence of spherical aberrations, etc.

More preferably, two or more of the above requirements should be satisfied at the same time.

When the imaging optical system is equipped with a focusing mechanism, each requirement is set upon focusing on the longest distance.

For more reliable advantages, the lower and upper limits of each condition should be narrowed down to the following values.

The lower and upper limits of condition (1-1) should be set at 22, more preferably 24, and 27.5, more preferably 27.1, respectively.

The lower and upper limits of condition (1-2) should be set at 1.60, more preferably 1.61, and 1.70, more preferably 1.65, respectively.

The lower and upper limits of condition (2) should be set at 0.50, more preferably 0.55, and 0.64, more preferably 0.63, respectively.

The lower and upper limits of condition (3) should be set at 0.25, more preferably 0.3, and 0.43, more preferably 0.4, respectively.

The lower and upper limits of condition (4) should be set at 0.25, more preferably 0.28, and 0.31, more preferably 0.3, respectively.

The lower and upper limits of condition (5) should be set at 1.25, more preferably 1.28, and 3, more preferably 2, respectively.

The lower and upper limits of condition (6) should be set at 2.5, more preferably 2.6, and 3.5, more preferably 3.2, respectively.

The lower and upper limits of condition (7) should be set at 0.8, more preferably 1.0, and 1.5, more preferably 1.3, respectively.

The lower and upper limits of condition (8) should be set at 0.8, more preferably 1.0, and 1.2, more preferably 1.1, respectively.

The lower and upper limits of condition (9) should be set at −0.5, more preferably −0.45, and −0.1, more preferably −0.25, respectively.

The lower and upper limits of condition (10) should be set at 0.6, more preferably 0.65, and 1.1, more preferably 1.0, respectively.

The invention also provides an imaging apparatus comprising an imaging optical system and an imaging device that is located on the image side of that imaging optical system and has an imaging plane, wherein said imaging optical system is any one of the above imaging optical systems.

The inventive imaging optical systems as described above may be used for imaging apparatus such as on-board cameras, surveillance cameras, digital cameras, digital video cameras, and small-format cameras mounted on cellular phone, personal computers, etc.

The taking half angle of view is from 70° to 100° inclusive.

The imaging apparatus equipped with the inventive imaging optical system is capable of taking images over a wide angle of view albeit being of small-format size. With a taking half angle of view of 70° or greater, the inventive imaging apparatus would be convenient in surveillance cameras or like other applications. Moreover, the imaging apparatus having a taking half angle of view of 80° or greater would be move convenient. When it comes to the imaging apparatus having a taking half angle of view of greater than 100°, the first lens component is likely to grow bulky for the purpose of making sure an optical path. That is, the taking half angle of view is preferably less than 100°, and more preferably less than 95°.

According to the invention, it is possible to provide an imaging optical system that works for size reductions and cost reductions while keeping a wide angle of view and optical performance as desired. It is further possible to provide an imaging apparatus incorporating such an imaging optical system.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 9 is illustrative of a resilient member: FIGS. 9(*a*) and 9(*b*) are a front and a side view, respectively.

DESCRIPTION OF EXEMPLARY EMBODIMENTS

Figure 1:
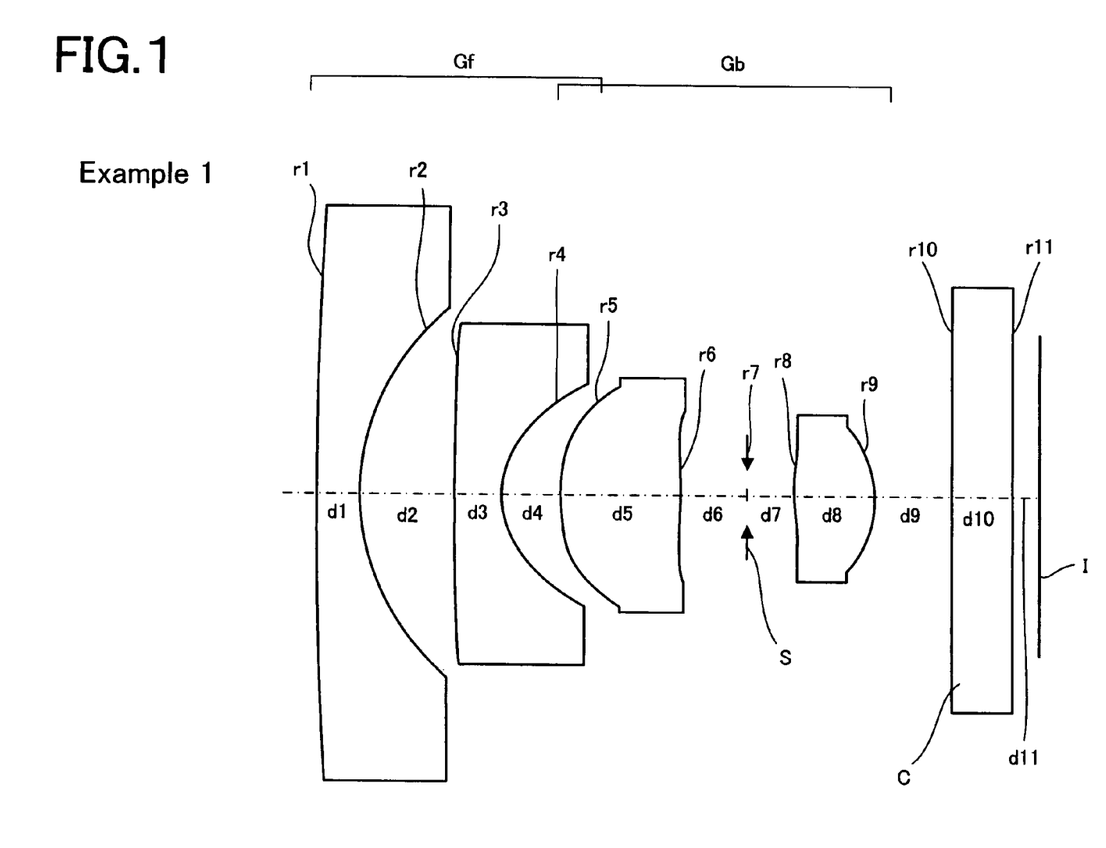
FIG. 1 is illustrative in section of the optical system according to Example 1.
Figure 2:
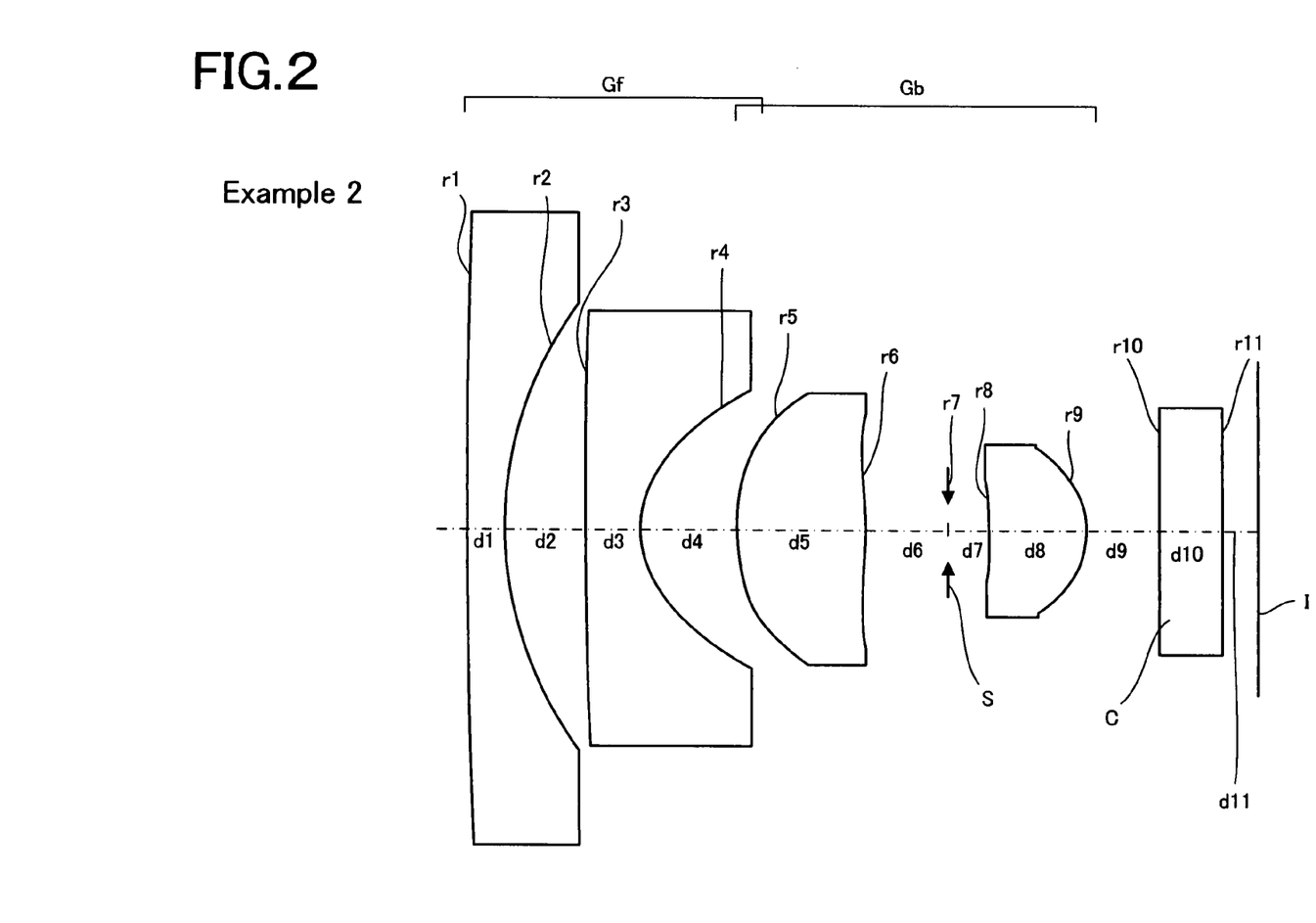
FIG. 2 is illustrative in section of the optical system according to Example 2.
Figure 3:
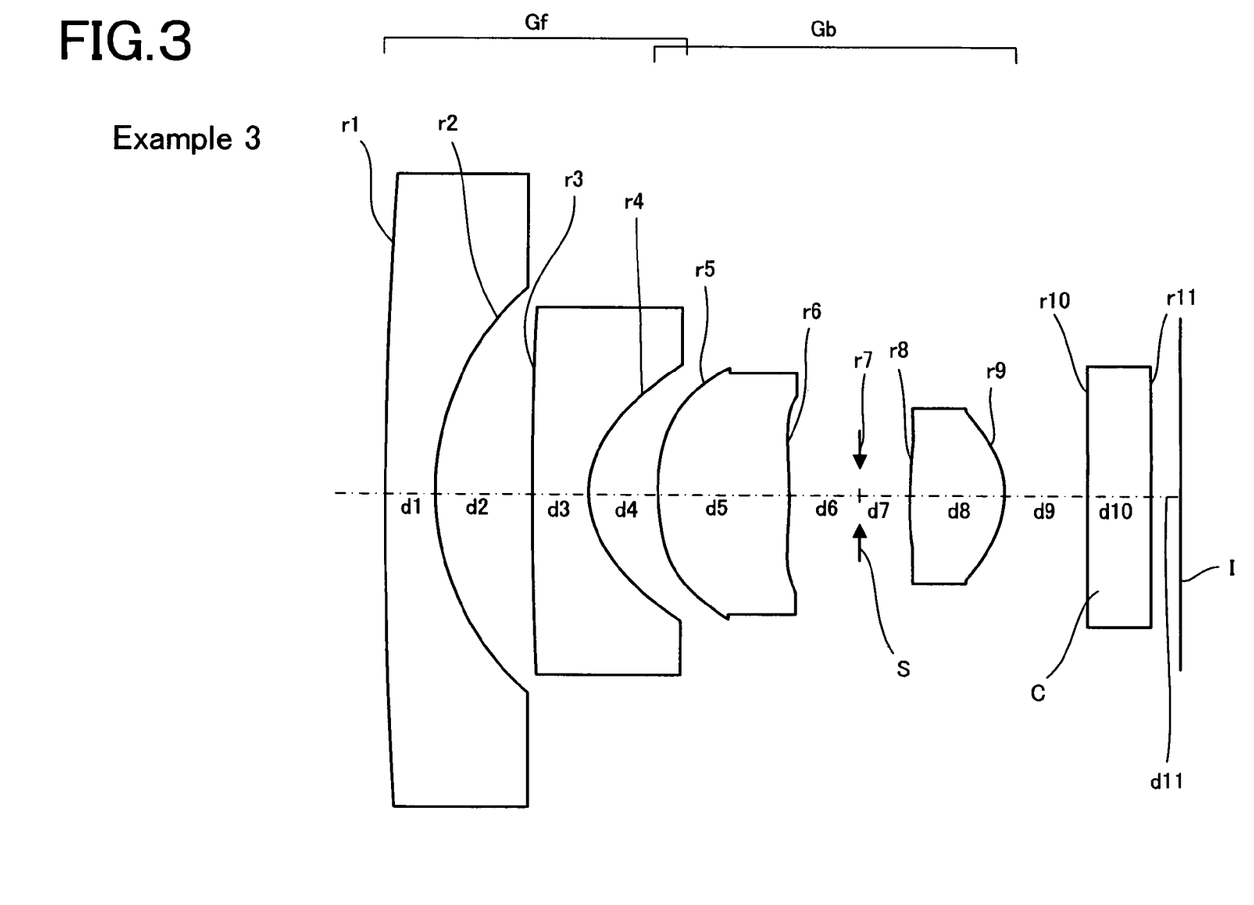
FIG. 3 is illustrative in section of the optical system according to Example 3.

The inventive imaging lens is now explained with reference to Examples 1, 2 and 3. Sectional views of the lens arrangements of Examples 1, 2 and 3 are shown in FIGS. 1, 2 and 3. Throughout the drawings, the front lens group is indicated by Gf, the rear lens group by Gb, the aperture stop by S, the cover glass by C, and the imaging plane of a light receptor array by I. The plane-parallel plate shown is the cover glass C for protecting the imaging plane of the imaging device, and coated on its surface with an infrared cut coating.

The optical systems of Examples 1, 2 and 3 according to the invention are now explained.

FIG. 1 is illustrative in section of the optical system according to Example 1.

As shown in FIG. 1, the imaging optical system of Example 1 is made up of, in order from its object side, the front lens group Gf of negative refracting power and the rear lens group Gb of positive refracting power.

The front lens group Gf is made up of, in order from its object side, a negative meniscus lens that is the first lens component concave on its image side and a negative meniscus lens that is the second lens component concave on its image side.

The rear lens group Gb is made up of, in order from its object side, a double-convex positive lens that is the third lens component, the aperture stop S, and a double-convex positive lens that is the fourth lens component.

Six aspheric surfaces are used: two at both surfaces of the negative meniscus lens on the image side of the front lens group Gf, two at both surfaces of the double-convex positive lens on the object side of the rear lens group Gb, and two at both surfaces of the double-convex positive lens on the image side of the rear lens group Gb.

FIG. 2 is illustrative in section of the optical system according to Example 2.

As shown in FIG. 2, the imaging optical system of Example 2 is made up of, in order from its object side, the front lens group Gf of negative refracting power and the rear lens group Gb of positive refracting power.

The front lens group Gf is made up of, in order from its object side, a negative meniscus lens that is the first lens component concave on its image side and a negative meniscus lens that is the second lens component concave on its image side.

The rear lens group Gb is made up of, in order from its object side, a double-convex positive lens that is the third lens component, the aperture stop S, and a double-convex positive lens that is the fourth lens component.

Five aspheric surfaces are used: one at the image side surface of the negative meniscus lens in the front lens group Gf, two at both surfaces of the double-convex positive lens on the object side of the rear lens group Gb, and two at both surfaces of the double-convex positive lens on the image side of the rear lens group Gb.

FIG. 3 is illustrative in section of the optical system according to Example 3.

As shown in FIG. 3, the imaging optical system of Example 3 is made up of, in order from its object side, the front lens group Gf of negative refracting power and the rear lens group Gb of positive refracting power.

The front lens group Gf is made up of, in order from its object side, a negative meniscus lens that is the first lens component concave on its image side and a negative meniscus lens that is the second lens component concave on its image side.

The rear lens group Gb is made up of, in order from its object side, a double-convex positive lens that is the third lens component, the aperture stop S, and a double-convex positive lens that is the fourth lens component.

Five aspheric surfaces are used: one at the image side surface of the negative meniscus lens on the image side of the front lens group Gf, two at both surfaces of the double-convex positive lens on the object side of the rear lens group Gb, and two at both surfaces of the double-convex positive lens on the image side of the rear lens group Gb.

Set out below are numerical data about Examples 1, 2 and 3. In those numerical data about Examples 1, 2 and 3, r is the radius of curvature of each lens surface, d is a lens thickness or air spacing, nd and vd are the refractive index and Abbe constant of each lens on an air calculated basis, f is a focal length, Fno is an F-number, ω is a taking half angle of view (°), BF is a back focus on an air calculated basis, and L is the whole length of each optical system (and filters are given on an air calculated basis, too).

In the numerical examples of the inventive imaging optical system given below, there are imaging optical systems obtained which are as low as about 2.8 in the F-number, and give images of high quality, albeit having a half angle of view of as large as about 80°, and are made up of fewer lenses, ensuring compactness and low costs.

In each numerical example, the first lens component is a single lens of glass; the second lens component is a single lens of plastics having aspheric surfaces on one or both sides; the third lens component is a single lens of plastics having aspheric surfaces on one or both sides; and the fourth lens component is a single lens of plastics having aspheric surfaces on both sides.

The aperture stop is of constant aperture size.

Focusing is not implemented because of reliance on pan focusing.

When x is an optical axis provided that the direction of travel of light is positive and y is a direction orthogonal to the optical axis, aspheric configuration is given by:

$$x=(y^2/r)/[1+\{1-(K+1)(y/r)^2\}^{1/2}]+A4y^4+A6y^6+A8y^8+A10y^{10}+A12y^{12}$$

where r is a paraxial radius of curvature, K is a conical coefficient, and A4, A6, A8, A10 and A12 are the fourth-, the sixth-, the eighth-, the tenth-, and the twelfth-order aspheric coefficient, respectively.

Numerical Example 1

Unit mm
Surface Data

| Surface No. | r | d | nd | vd |
|---|---|---|---|---|
| 1 | 105.901 | 0.90 | 1.59551 | 39.22 |
| 2 | 4.703 | 1.92 | | |
| 3 (Aspheric Surface) | 200.200 | 1.00 | 1.52542 | 55.78 |
| 4 (Aspheric Surface) | 2.203 | 1.22 | | |
| 5 (Aspheric Surface) | 4.365 | 2.50 | 1.61421 | 25.60 |
| 6 (Aspheric Surface) | −8.078 | 1.35 | | |
| 7 (Stop) | ∞ | 0.99 | | |
| 8 (Aspheric Surface) | 9.957 | 1.70 | 1.52542 | 55.78 |
| 9 (Aspheric Surface) | −1.795 | 1.54 | | |
| 10 | ∞ | 1.22 | 1.54424 | 70.87 |
| 11 | ∞ | 0.57 | | |
| Image Plane | ∞ | | | |

Aspheric Data

3rd Surface

K = 0.000, A4 = 8.14140E−04, A6 = −5.94490E−05,
A8 = 8.99370E−06, A10 = −4.53820E−07

4th Surface

K = −0.207, A4 = 2.13520E−02, A6 = −4.09430E−03,
A8 = 1.56860E−03, A10 = −2.76370E−04

5th Surface

K = 0.000, A4 = 2.53890E−02, A6 = −6.73870E−04,
A8 = −2.68480E−05, A10 = 3.39730E−05

6th Surface

K = 0.000, A4 = 3.23180E−02, A6 = −1.27060E−02,
A8 = 6.06850E−03, A10 = −7.80470E−04

8th Surface

K = −4.251, A4 = −1.45770E−03, A6 = −2.38580E−02,
A8 = 1.53520E−02, A10 = −2.84950E−03

9th Surface

K = −1.068, A4 = 3.66160E−03, A6 = 1.62510E−03,
A8 = −3.56370E−03, A10 = 9.65320E−04

Various Data

| | |
|---|---|
| f | 1.44 |
| ω | 82.92° |
| Fno | 2.8 |
| BF | 2.90 |
| L | 14.48 |

Numerical Example 2

Unit mm
Surface Data

| Surface No. | r | d | nd | vd |
|---|---|---|---|---|
| 1 | 221.315 | 0.70 | 1.59551 | 39.24 |

-continued

Unit mm
Surface Data

| 2 | 6.730 | 1.53 | | |
| 3 | 104.036 | 1.01 | 1.52540 | 56.25 |
| 4 (Aspheric Surface) | 1.851 | 1.83 | | |
| 5 (Aspheric Surface) | 3.768 | 2.41 | 1.60687 | 27.00 |
| 6 (Aspheric Surface) | −9.074 | 1.55 | | |
| 7 (Stop) | ∞ | 0.80 | | |
| 8 (Aspheric Surface) | 270.889 | 1.85 | 1.52540 | 56.25 |
| 9 (Aspheric Surface) | −1.568 | 1.37 | | |
| 10 | ∞ | 1.22 | 1.51633 | 64.14 |
| 11 | ∞ | 0.63 | | |
| Image Plane | ∞ | | | |

Aspheric Data

4th Surface $K = -2.350, A4 = 3.75044E-02, A6 = -6.23094E-03,$
$A8 = 1.15508E-03, A10 = -9.17640E-05$ 5th Surface $K = -1.402, A4 = 7.60399E-03, A6 = 2.52234E-04,$
$A8 = 1.26458E-04$ 6th Surface $K = 19.012, A4 = 5.48350E-03, A6 = 5.22567E-03,$
$A8 = -1.11470E-03, A10 = 2.06491E-04$ 8th Surface $K = 9.620, A4 = -7.44277E-02, A6 = 2.84804E-02,$
$A8 = -4.15675E-02, A10 = 1.60270E-02, A12 = 1.61498E-08$ 9th Surface $K = -1.045, A4 = -1.36746E-02, A6 = -4.38406E-03,$
$A8 = -2.36040E-04, A10 = -3.62638E-04$ Various Data

| f | 1.43 |
| ω | 82.92° |
| Fno | 2.8 |
| BF | 2.81 |
| L | 14.49 |

Numerical Example 3

Unit mm
Surface Data

| Surface No. | r | d | nd | νd |
| --- | --- | --- | --- | --- |
| 1 | 110.364 | 0.90 | 1.59551 | 39.22 |
| 2 | 4.779 | 1.86 | | |
| 3 | 73.494 | 1.09 | 1.52542 | 55.78 |
| 4 (Aspheric Surface) | 2.267 | 1.27 | | |
| 5 (Aspheric Surface) | 4.035 | 2.48 | 1.61421 | 25.60 |
| 6 (Aspheric Surface) | −9.784 | 1.33 | | |
| 7 (Stop) | ∞ | 0.96 | | |
| 8 (Aspheric Surface) | 9.761 | 1.75 | 1.52542 | 55.78 |
| 9 (Aspheric Surface) | −1.773 | 1.54 | | |
| 10 | ∞ | 1.22 | 1.54424 | 70.87 |
| 11 | ∞ | 0.51 | | |
| Image Plane | ∞ | | | |

Aspheric Data

4th Surface $K = -0.183, A4 = 3.09360E-02, A6 = -1.11430E-02,$
$A8 = 2.43500E-03, A10 = -2.78760E-04$ 5th Surface -continued Unit mm
Surface Data $K = 0.000, A4 = 2.47030E-02, A6 = -3.87920E-03,$
$A8 = 8.59140E-04, A10 = -4.31590E-05$ 6th Surface $K = 0.000, A4 = 2.12200E-02, A6 = -4.90370E-03,$
$A8 = 4.04250E-03, A10 = -5.85790E-04$ 8th Surface $K = -1.357, A4 = -3.58710E-02, A6 = 1.55290E-02,$
$A8 = -1.27140E-02, A10 = 5.55860E-03$ 9th Surface $K = -1.065, A4 = -1.07310E-02, A6 = 8.73970E-03,$
$A8 = -6.53620E-03, A10 = 1.46580E-03$ Various Data

| f | 1.49 |
| ω | 82.92° |
| Fno | 2.8 |
| BF | 2.86 |
| L | 14.50 |

Figure 4:
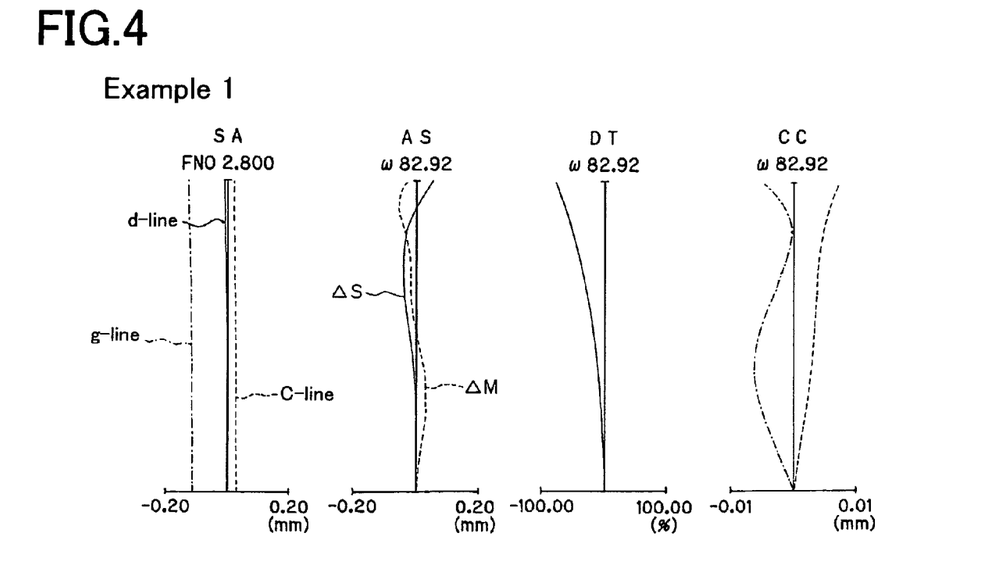
FIG. 4 is a diagram indicative of various aberrations of the optical system according to Example 1 upon focusing at infinity.
Figure 5:
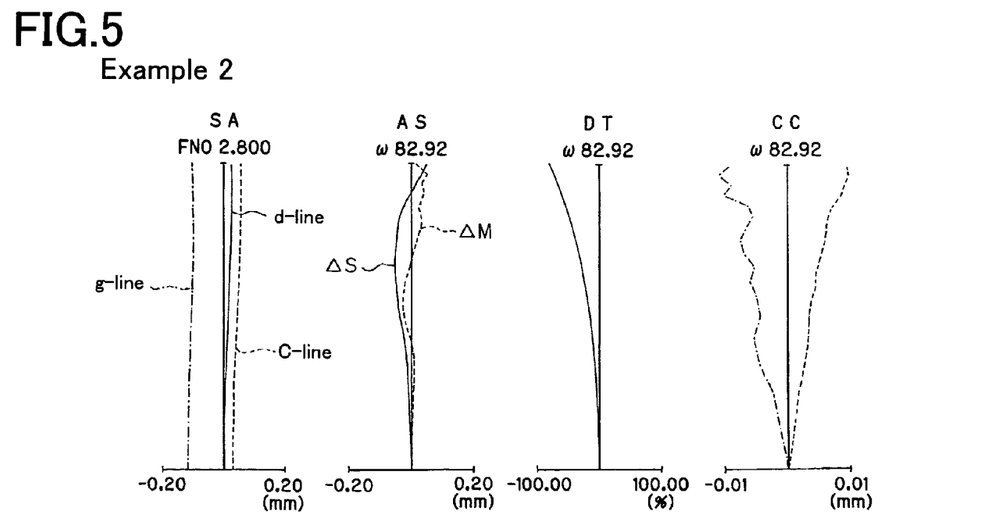
FIG. 5 is a diagram indicative of various aberrations of the optical system according to Example 2 upon focusing at infinity.
Figure 6:
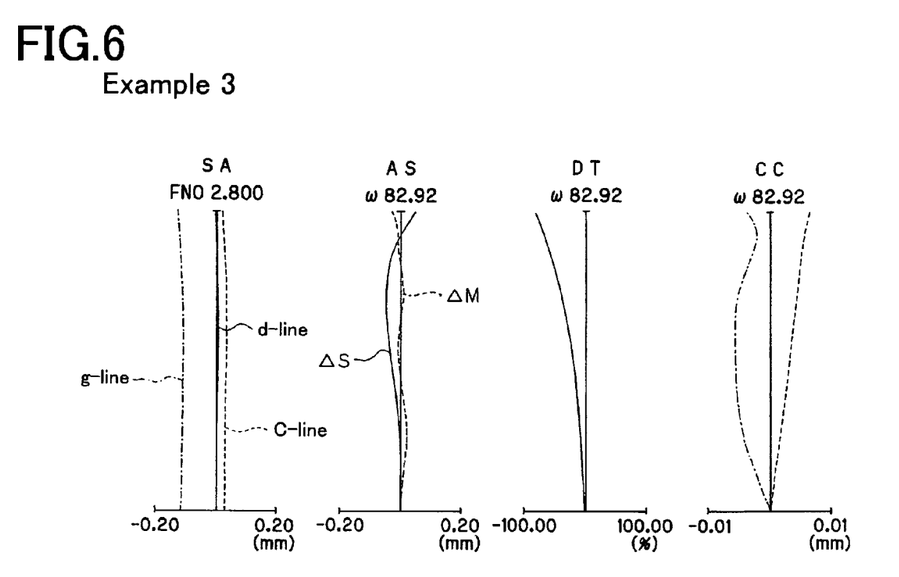
FIG. 6 is a diagram indicative of various aberrations of the optical system according to Example 3 upon focusing at infinity.

FIGS. 4, 5 and 6 are diagrams for various aberrations of the imaging optical systems according to Examples 1, 2 and 3. Given for spherical aberrations and chromatic aberration of magnification are values at 587.6 nm (d-line; a solid line), 435.8 nm (g-line; a one dotted line) and 656.3 nm (C-line; a dotted line). For astigmatism, a solid line is indicative of the sagittal image surface, and a dotted line is indicative of the meridional image surface.

Tabulated below are the values of conditions (1) to (10) in Examples 1, 2 and 3.

| Condition | Example 1 | Example 2 | Example 3 |
| --- | --- | --- | --- |
| (1-1) | 25.60 | 27.00 | 25.60 |
| (1-2) | 1.61421 | 1.60687 | 1.61421 |
| (2) | 0.623 | 0.596 | 0.611 |
| (3) | 0.342 | 0.398 | 0.332 |
| (4) | 0.292 | 0.303 | 0.299 |
| (5) | 1.524 | 1.292 | 1.532 |
| (6) | 3.021 | 2.630 | 2.727 |
| (7) | 1.093 | 1.063 | 1.091 |
| (8) | 1.022 | 1.036 | 1.064 |
| (9) | −0.298 | −0.413 | −0.416 |
| (10) | 0.694 | 0.988 | 0.693 |

One example of the lens assembly using one of the above examples is now explained with reference to FIGS. 7 and 8.

Figure 7:
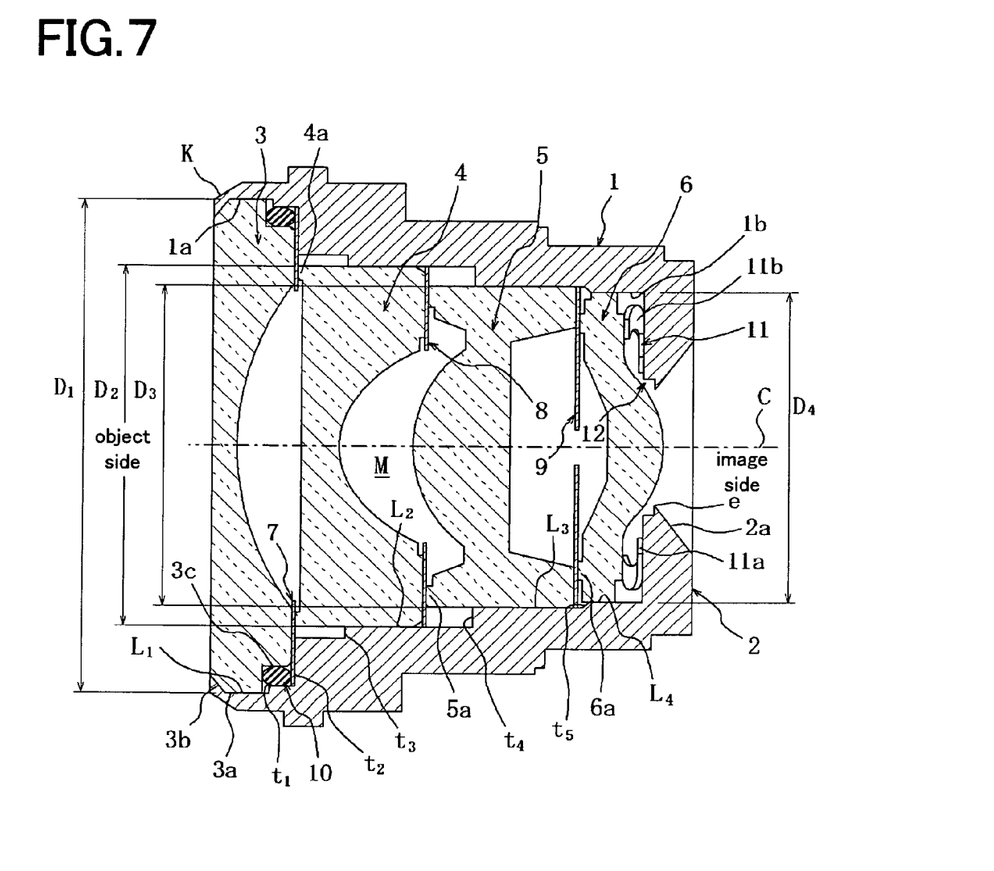
FIG. 7 is illustrative in section of one embodiment of the lens assembly incorporating the imaging optical system according to the invention.
Figure 8:
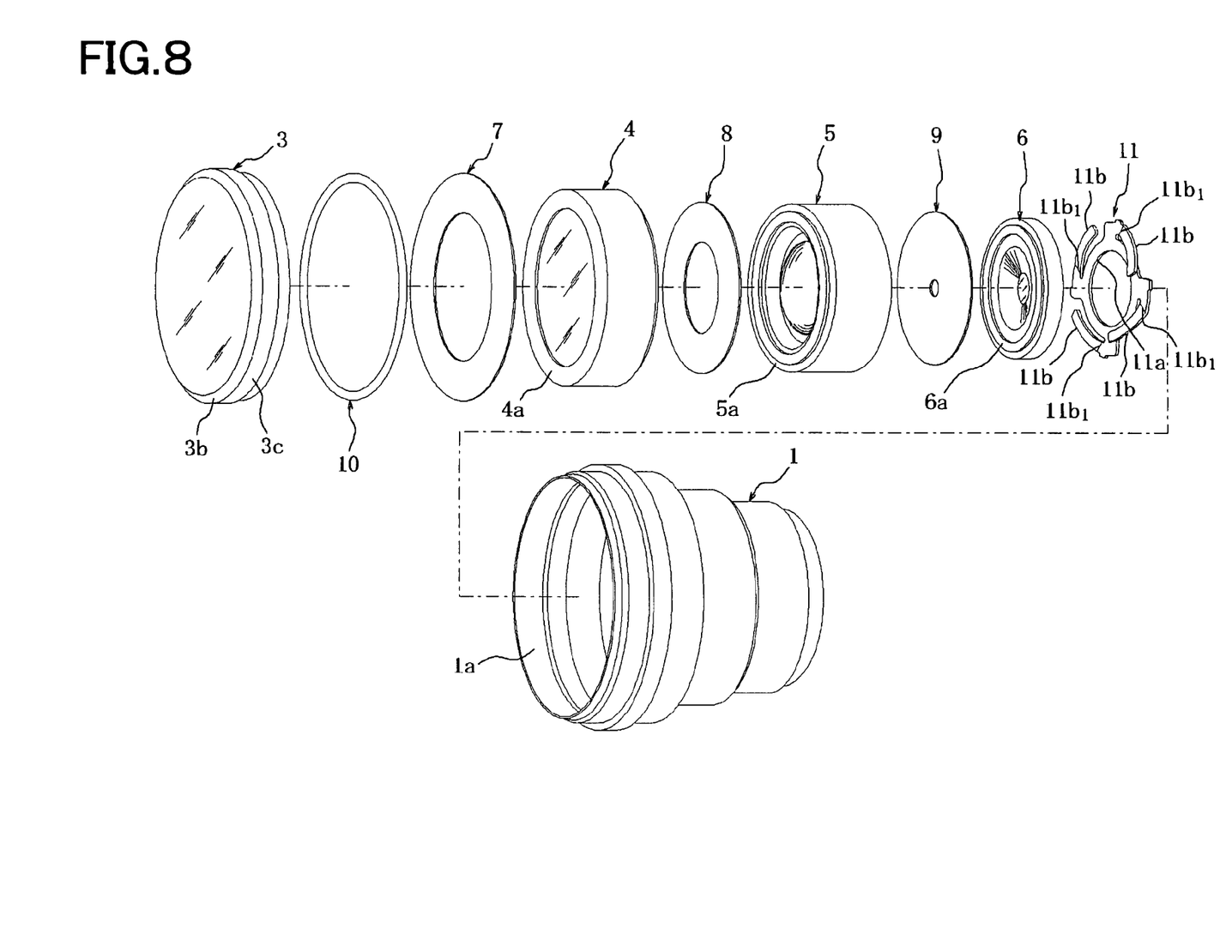
FIG. 8 is an exploded, schematic view of the lens assembly shown in FIG. 7.

FIG. 7 is illustrative in section and schematic of one embodiment of the lens assembly using the imaging optical system according to the invention, and FIG. 8 is an exploded, perspective view of that embodiment.

In FIGS. 7 and 8, reference numeral 1 stands for a lens barrel in which an area M is provided to receive lenses. The lens barrel 1 is built up of an annular form of peripheral wall made of a plastic or metallic material, and includes openings 1a and 1b open toward the object side (the left side of the paper) and the image side (the right side of the paper). The openings 1a and 1b here are called the ingoing opening 1a and the outgoing opening 1b, respectively. Light on the object side enters the lens barrel 1 through the ingoing opening 1a, and leaves the lens barrel 1 through the outgoing opening 1b, arriving at an imaging device (not shown). The inner peripheral surface of the lens barrel 1 having the area M to receive lenses is provided with steps $t_1$ to $t_5$ that provide inner peripheral wall surfaces (seat surfaces) $L_1$ to $L_4$ to receive lenses, which have diameters $D_1$ to $D_4$ phased down toward the outgoing opening 1b.

Reference numeral 2 stands for a flare stop wall provided at the outgoing opening 1b. This flare stop wall 2 is integrally joined to the outgoing opening 1b, and includes a through-hole 2a in which the central portion including the optical axis of the lenses located on the image side (as will be described later) is exposed.

Reference numeral 3 stands for the first lens component that is forced through the ingoing opening 1a in the lens barrel 1 and received on the seat surface $L_1$ so that it is fixed by caulking K to the lens barrel 1. The first lens component 3 has an outer peripheral surface 3a fitted over the seat surface $L_1$, and has a front outer edge provided with a bevel 3b over which a deformed site of the lens barrel 1 goes during caulking.

Reference numeral 4 is indicative of the second lens component that is located adjacent to the first lens component 3 and on the seat surface $L_2$. The front surface of the second lens component 4 is provided with an engagement 4a that is in surface contact with the rear surface of the first lens component 3 via the flare stop.

Reference numeral 5 is indicative of the third lens component that is located adjacent to the second lens component 4 and on the seat surface $L_3$. As with the second lens component 4, the front surface of the third lens component 5 is provided with an engagement 5a that is in surface contact with the rear surface of the second lens component 4 via the flare stop.

Reference numeral 6 is indicative of the fourth lens component that is located adjacent to the third lens component 5 and on the seat surface $L_4$. The front surface of this fourth lens component 6 is provided with an engagement 6a that is in surface contact with the rear surface of the third lens component 5 via an aperture stop. The fourth lens component 6 is located such that the vertex of the image side lens juts out of the through-hole 2a in the flare stop wall 2. The second 4; the third 5, and the fourth lens component 6 may be provided on its outer peripheral surface with one or two or more cut faces.

Reference numeral 7 is indicative of a sheet-form flare stop located between the first 3 and the second lens component 4; 8 a sheet-form flare stop located between the second 4 and the third lens component 5; and 9 a sheet-form aperture stop located between the third 5 and the fourth lens component 6. The aperture stop 9 limits the diameter of an axial bundle, and the flare stops 7 and 8 play a role of shielding off inessential light components of object side light incident from the first lens component 3: off-axis marginal rays leading to coma and stray light responsible for ghosts. The stop 7, 8, and 9 is constructed of a polyester or other sheet, and matted or otherwise coated with a black coating for the purpose of preventing incidence or reflection of inessential light. Alternatively, the stop 7, 8, and 9 may be provided by coating the end face of the associated lens component with a black coating.

Reference numeral 10 is a seal member exemplified by an O-ring. This seal member 10 is held between a recess 3c provided in the rear, outer edge of the first lens component 3 and the step (step surface) $t_2$ of the lens barrel 1 to keep a space between them airtight.

Reference numeral 11 is indicative of a resilient member (leaf spring) interposed between the fourth lens component 6 and the flare stop wall 2. As the first lens component 3 is forced onto the seat surface $L_1$, that resilient member 11 produces repulsive force to bring the end faces of the lens components 3, 4, 5 and 6 in resilient contact (support) with each other to position them within the lens barrel 1. The resilient member comprises a thin annular base 11a that is larger than the through-hole 2a in the flare stop wall 2 and has an opening large enough to receive the central convex portion (optical function surface) of the fourth lens component 6, and a plurality of arms (of sheet shape) 11b supported at and integrally joined to the outer edge of the annular base 11a in a cantilevered manner.

Figure 9:
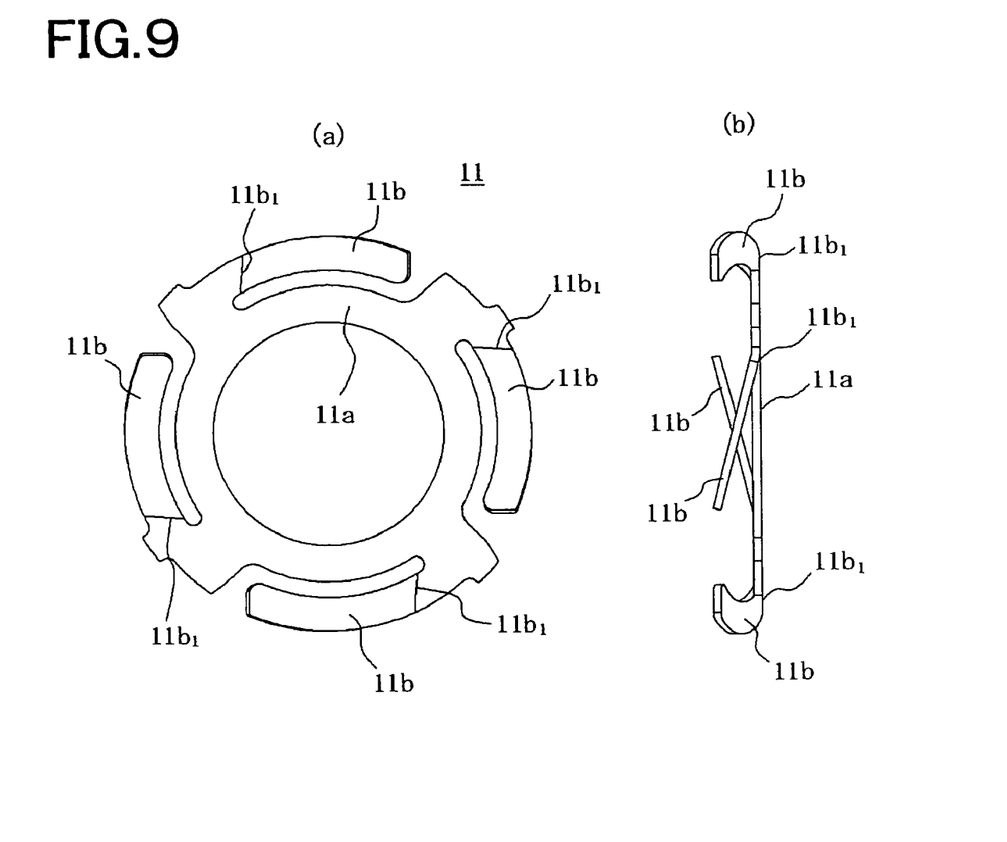
Figure 10:
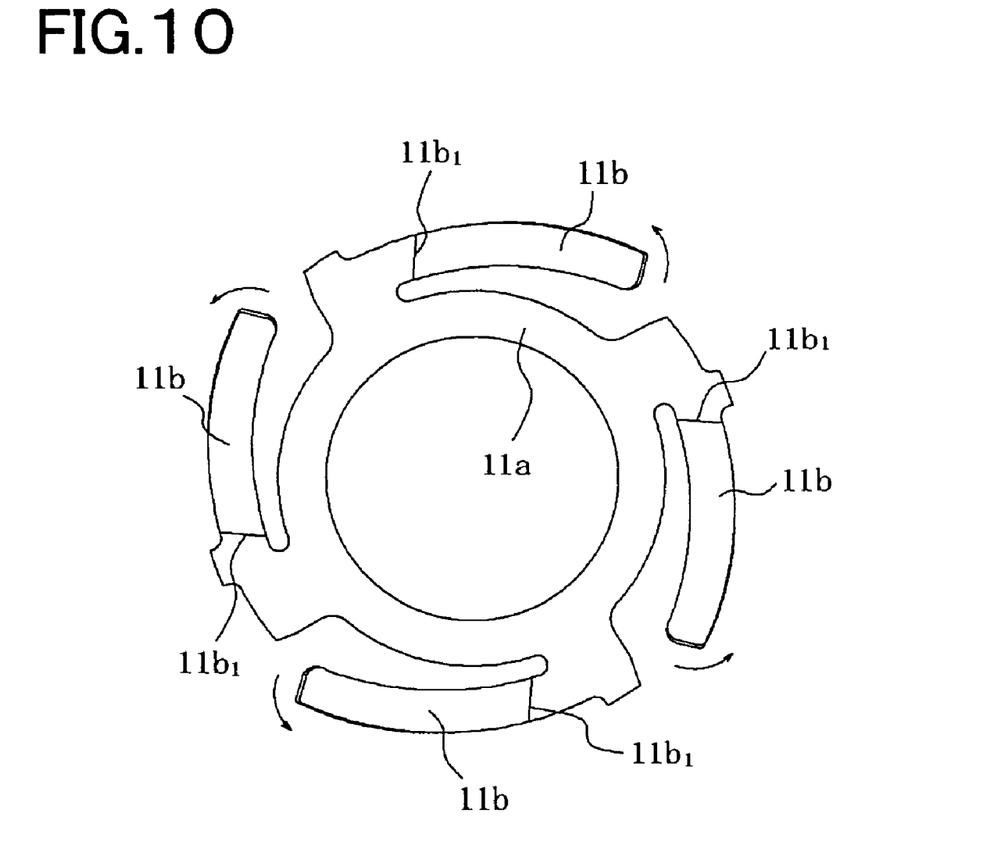
FIG. 10 is illustrative of how the resilient member is displaced.

FIGS. 9(a) and 9(b) are a front and a side view of the resilient member 11, and FIG. 10 is illustrative of how the resilient member is displaced.

Each arm 11b is provided at its root with a bent $11b_1$ (bending line) that bends the arm itself slightly in the thickness direction. As the resilient member 11 produces repulsive force, the end of the arm 11b is prevented from extending outwardly in the diametrical direction and contacting the seat surface $L_5$, so that the arm can serve its own function more effectively.

Reference numeral 12 is indicative of a stopper provided on the inner surface of the flare stop wall 2. As there are external vibrations such as unexpected impacts introduced into the fourth lens component 6, the edge e of the through-hole 2a in the flare stop wall 2 engages the outside of the fourth lens component 6 in the diametrical direction before doing the outer surface of the fourth lens component 6. In other words, the stopper 12 prevents lens flaws in the effective diameter, which may possibly be caused by contact of the lens with the edge e of the through-hole 2a. For the stopper 12, an annular convex portion or a plurality of spaced projections may be used.

When the imaging optical system according to the invention is assembled into the lens assembly, the resilient member 11 is first fitted in the lens barrel 1. Then, the fourth lens component 6, the aperture stop 9, the third lens component 5, the flare stop 8, the second lens component 4, and the flare stop 7 are located in order. Then, the first lens component 3 together with the seal member 10 is forced into the ingoing opening 1a in the lens barrel 1 and, thereafter, the lens barrel 1 is caulked to fix the first lens component 3 onto the seat surface $L_1$. Here, the resilient member 11 produces repulsive force so that the first lens component 3 allows the second 4, the third 5 and the fourth lens component 6 to be in resilient contact with each other. It is thus possible to position the respective lens components precisely along the direction of the optical axis c in the lens barrel 1 with no need of excessive work.

The shape of the resilient member 11 may optionally be varied provided that it can resiliently support the respective lens components along the optical axis. Alternatively, a rubber member may be used in place of the leaf spring.

What is claimed is:

1. An imaging optical system consisting of, in order from its object side,
   a front lens group of negative refracting power, and
   a rear lens group of positive refracting power, wherein:
   when a lens component is defined by a lens body having only two surfaces: an object side surface and an image side surface in contact with air on an optical axis,
   said front lens group comprises, in order from its object side,
   a first lens component concave on its image side and having negative refracting power, and
   a second lens component concave on its image side and having negative refracting power,
   said rear lens group comprises, in order from its object side,
   a third lens component convex on its object side and having positive refracting power, and
   a fourth lens component having positive refracting power, a sum of the total number of lens components in said front lens group and the total number of lens components in said rear lens group is 4, and said third component comprises a plastic positive lens that includes an aspheric surface and satisfies the following conditions (1-1) and (1-2):

$$19<v3<29 \tag{1-1}$$

$$1.59<n3<1.80 \tag{1-2}$$

where v3 is an Abbe constant of said plastic positive lens in said third lens component, and n3 is a d-line refractive index of said plastic positive lens in said third lens component.

2. The imaging optical system according to claim 1, wherein the first lens component is a single lens.

3. The imaging optical system according to claim 1, wherein the second lens component is a single lens.

4. The imaging optical system according to claim 1, wherein the third lens component is a single lens.

5. The imaging optical system according to claim 1, wherein the fourth lens component is a single lens.

6. The imaging optical system according to claim 1, wherein the first lens component, the second lens component, the third lens component, and the fourth lens component is a single lens.

7. The imaging optical system according to claim 6, wherein:

a lens located in the first lens component and nearest to its object side is a glass lens, and the second lens component, the third lens component, and the fourth lens component comprises a plastic lens having an aspheric surface.

8. The imaging optical system according to claim 1, which further satisfies the following condition (2):

$$0.45<fa/|f12|<0.65 \tag{2}$$

where f12 is a focal length of the front lens group, and fa is a focal length of the whole imaging optical system.

9. The imaging optical system according to claim 1, which further satisfies the following condition (3):

$$0.2<fa/|f2|<0.45 \tag{3}$$

where f2 is a focal length of the second lens component, and fa is a focal length of the whole imaging optical system.

10. The imaging optical system according to claim 1, which further satisfies the following condition (4):

$$0.2<fa/f3<0.33 \tag{4}$$

where f3 is a focal length of the third lens component, and fa is a focal length of the whole imaging optical system.

11. The imaging optical system according to claim 1, which further satisfies the following conditions (5) and (6):

$$1.2<R4/fa<4 \tag{5}$$

$$2.0<R5/fa<5.0 \tag{6}$$

where

R4 is a paraxial radius of curvature of an image side surface of the second lens component, R5 is a paraxial radius of curvature of an object side surface of the third lens component, and fa is the focal length of the whole imaging optical system.

12. The imaging optical system according to claim 1, which further satisfies the following condition (7):

$$0.6<(R1+R2)/(R1-R2)<2.5 \tag{7}$$

where

R1 is a paraxial radius of curvature of an object side surface of the first lens component, and R2 is a paraxial radius of curvature of an image side surface of the first lens component.

13. The imaging optical system according to claim 1, which further satisfies the following condition (8):

$$0.6<(R3+R4)/(R3-R4)<1.3 \tag{8}$$

where

R3 is a paraxial radius of curvature of an object side surface of the second lens component, and R4 is a paraxial radius of curvature of an image side surface of the second lens component.

14. The imaging optical system according to claim 1, which further satisfies the following condition (9):

$$-0.6<(R5+R6)/(R5-R6)<0.1 \tag{9}$$

where

R5 is a paraxial radius of curvature of an object side surface of the third lens component, and R6 is a paraxial radius of curvature of an image side surface of the third lens component.

15. The imaging optical system according to claim 1, which further satisfies the following condition (10):

$$0.5<(R8+R9)/(R8-R9)<1.2 \tag{10}$$

where

R8 is a paraxial radius of curvature of an object side surface of the fourth lens component, and R9 is a paraxial radius of curvature of an image side surface of the fourth lens component.

16. An imaging apparatus, comprising:

an imaging optical system as recited in claim 1, and an imaging device that is located on an image side of the imaging optical system and has an imaging plane.

17. The imaging apparatus according to claim 16, wherein a taking half angle of view is from 70° to 100° inclusive.

* * * * *